Nov. 5, 1929.  A. F. KNOTT  1,734,861
COMBINED RAKE AND HOE
Filed Feb. 23, 1928
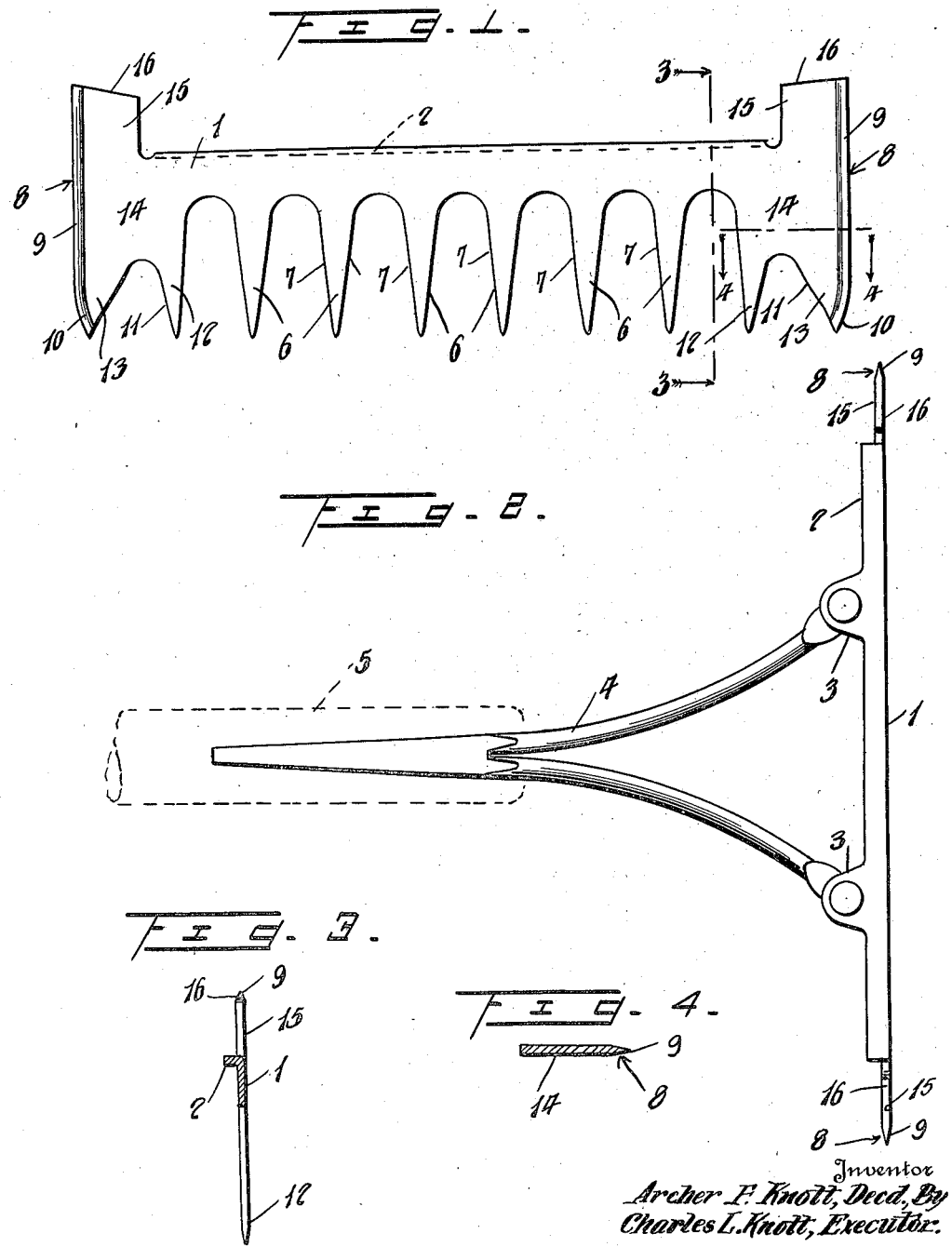
Inventor
Archer F. Knott, Decd, By
Charles L. Knott, Executor.

Patented Nov. 5, 1929

1,734,861

UNITED STATES PATENT OFFICE

ARCHER F. KNOTT, OF DINWIDDIE, VIRGINIA; CHARLES L. KNOTT, EXECUTOR OF SAID ARCHER F. KNOTT, DECEASED, ASSIGNOR TO RICHMOND PRESSED METAL WORKS, INCORPORATED, OF RICHMOND, VIRGINIA

COMBINED RAKE AND HOE

Application filed February 23, 1928. Serial No. 256,429.

The invention relates to an agricultural implement of the rake type having at the end of the rake head hoe blades.

A further object of the invention is to provide a tool of the type stated having well defined blades at the ends of the rake head, said blades having their ends extending in the direction of the rake teeth formed with recesses of less depth than the recesses defining the teeth, the body of the hoe blade admitting of use as a hoe, when the tool is in position with the teeth presented towards the ground, so that when cultivating growing plants with the tool, by raking, either end of the rake head may be used to pull dirt up to the roots of the plants without changing the position of the tool head. Furthermore, the shorter teeth defined by the shallower recesses function as teeth in the same manner as the longer teeth.

A further object of the invention is the provision of a rake head having hoe blades at the ends of the head provided with pointed projections at the ends corresponding to the teeth of the rake and the other ends of the hoe blades defined by portions extended on the other side of the head from the teeth, and having their ends inclined inwardly from the outer edges of the blades towards the rake head. This structure admits of using the extended portions to work in close to the plants for cutting out grass and weeds without interference by the teeth of the rake as occurs when an ordinary rake is used for cultivation.

The invention will be described in detail hereinafter and will be found illustrated in the accompanying drawings in which Figure 1 is a front view in elevation of the improved rake and hoe, Figure 2 is a top plan view, Figure 3 is a sectional view on a plane indicated by the line 3—3 of Figure 1, and Figure 4 is a sectional detail on a plane indicated by the line 4—4 of Figure 1.

In the drawings similar reference characters are used to designate corresponding parts in the several views.

The combined rake and hoe is made of a single blank of metal of sufficient thickness to give it rigidity and the blank is formed with a cross bar 1 that is strengthened by a flange 2 having ears 3 engaged by a fork member 4 to be secured to a handle 5. Teeth 6 are formed in the blank and depending from the cross bar 1, said teeth being defined by V-shaped recesses 7 cut out of the blank. At the ends of the cross bar 1 are formed hoe blades 8 having their edges sharpened as shown at 9, said sharpened edges 9 being substantially straight for a greater portion of the length of the blade and curved inwardly as shown at 10. 11 indicates recesses formed in the plate and extending in the direction of the recesses 7 but of shallower depth than said recesses that form shorter teeth 12 and 13 extending in the same direction as the teeth 6 and functioning as teeth for the rake when the rake head is in use. This structure provides a flat imperforate area 14 that forms the bodies of the blades 8 and enables the use of said ends to pull the dirt up around the roots of plants without changing the position of the rake in cultivating growing plants, and at the same time provides a rigid hoe blade for use when the rake head is held in a vertical position and the sharpened edges 9 utilized for cultivation.

The hoe blades 8 have extended portions 15 projecting above the cross bar 1 with their outer edges 16 inclined slightly inwardly of the tool head and towards the bar 1. These extended portions 15 enable the use of the tool for cutting out grass and weeds adjacent to the stalks of the growing plants without interference by the teeth of the rake, the rake teeth extending away from the stalks of the plants when so used as will be clearly understood.

What is claimed is:—

1. A combined rake and hoe, comprising a head having a bar, teeth formed integral with the bar, a hoe blade formed integral with the bar at one of its extremities, said hoe blade having a recess therein extending in the direction of recesses between the teeth and forming teeth shorter than the first mentioned teeth, and said hoe blade having a portion extending on the upper side of the bar.

2. A combined rake and hoe, comprising a head having a bar, teeth formed integral with the bar, a hoe blade formed integral with the bar at one of its extremities, said hoe blade having a V-shaped recess therein extending in the direction of recesses between the teeth, forming teeth shorter than the first mentioned teeth and providing the hoe blade with a pointed extremity on one of its side edges, the opposite side edge of the hoe blade extended beyond the bar and provided with a blunt end, the outer edge of the blade being straight and substantially perpendicular to the bar through the greater portion of its length, and said outer edge curved at the pointed end.

3. A combined rake and hoe, comprising a head formed of a single blank of metal having recesses therein forming teeth, a blade on an end of the plate having a recess therein extending in the direction of the first mentioned recesses but of less depth, the outer edge of said blade being straight for the greater portion of its length and curved towards the last mentioned recess to form a pointed end for the blade, the edge of the plate remote from the teeth having a flange, to stiffen the blade, ears extending from said flange and adapted to be secured to a fork member for securing the blade to a handle, the blade aforesaid having a portion extended beyond said flanged edge of the plate, and the outer edge of said portion inclined outwardly.

In testimony whereof I affix my signature.

ARCHER F. KNOTT.